(12) United States Patent
Spencer (10) Patent No.: US 10,087,003 B2
(45) Date of Patent: Oct. 2, 2018

(54) DIRECT COIL TRANSFER SYSTEM

(71) Applicant: PRIMETALS TECHNOLOGIES USA LLC, Alpharetta, GA (US)

(72) Inventor: Steven Spencer, Windham, ME (US)

(73) Assignee: PRIMETALS TECHNOLOGIES USA LLC, Alpharetta, GA (US)

( * ) Notice: Subject to any disclaimer, the term of this patent is extended or adjusted under 35 U.S.C. 154(b) by 0 days.

(21) Appl. No.: 15/258,202

(22) Filed: Sep. 7, 2016

(65) Prior Publication Data

US 2017/0073161 A1    Mar. 16, 2017

Related U.S. Application Data (60) Provisional application No. 62/216,499, filed on Sep. 10, 2015, provisional application No. 62/293,834, filed on Feb. 11, 2016.

(51) Int. Cl.
| | |
|---|---|
| *B65G 37/00* | (2006.01) |
| *B65G 7/08* | (2006.01) |
| *B21C 47/24* | (2006.01) |

(52) U.S. Cl.
CPC ............. *B65G 7/08* (2013.01); *B21C 47/24* (2013.01); *B21C 47/242* (2013.01)

(58) Field of Classification Search
CPC ..... B21C 47/24; B21C 47/242; B21C 47/245; Y10S 414/123; Y10S 414/124; Y10S 414/121; B65H 19/30
USPC .............. 118/317, DIG. 10; 294/67.2, 67.21, 294/67.22; 414/27, 910, 911
See application file for complete search history.

(56) References Cited

U.S. PATENT DOCUMENTS

| | | | | | |
|---|---|---|---|---|---|
| 1,373,513 | A | * | 4/1921 | Ladd | B66C 1/24 206/322 |
| 2,564,436 | A | * | 8/1951 | Jackes | B21C 47/24 414/784 |
| 2,600,538 | A | * | 6/1952 | Jackes | B66C 1/24 212/326 |
| 3,999,665 | A | * | 12/1976 | Rogers | B21C 47/006 212/81 |
| 4,306,826 | A | * | 12/1981 | Detwiler | B29D 30/0016 118/320 |
| 4,393,981 | A | * | 7/1983 | Wada | B65G 11/203 221/289 |
| 4,793,801 | A | * | 12/1988 | Roman | C21D 9/54 242/575.5 |
| 4,982,936 | A | * | 1/1991 | Mitchell | C21D 9/0018 266/249 |
| 5,332,351 | A | * | 7/1994 | Nelson | B21C 47/24 414/684 |
| 5,372,469 | A | * | 12/1994 | Kobayashi | B21C 47/24 212/199 |

(Continued)

*Primary Examiner* — Gregory W Adams
(74) *Attorney, Agent, or Firm* — Gesmer Updegrove LLP (57) ABSTRACT

A rolling mill coil handling system includes a downender for rotating a coil between a vertical position supported on a pallet, and a horizontal position suspended from a hollow stem projecting from the pallet. A hook carrier system includes a C-shaped hook with a horizontally projecting arm. The hook is manipulated by carrier system components to axially insert its arm into the stem, then to raise the arm through a slot in the stem and into contact with the coil, thereby raising the coil to a level at which it is no longer in contact with the stem, and then to axially withdraw the coil from the stem.

5 Claims, 7 Drawing Sheets

(56) References Cited

U.S. PATENT DOCUMENTS

| | | | | |
|---|---|---|---|---|
| 5,735,477 | A * | 4/1998 | Shore | B21C 47/14 242/363 |
| 7,004,718 | B2 * | 2/2006 | Braner | B21C 47/24 414/684 |
| 8,388,297 | B2 * | 3/2013 | Holloway | B21C 47/242 269/61 |
| 8,540,070 | B2 * | 9/2013 | Holloway P.E. | B21C 47/245 198/463.3 |

* cited by examiner

DIRECT COIL TRANSFER SYSTEM

PRIORITY

This application claims priority to U.S. Provisional Application Ser. No. 62/216,499 filed on Sep. 10, 2015 and U.S. Provisional Application Ser. No. 62/293,834 filed on Feb. 11, 2016, both of which are incorporated herein by reference in their entirety.

BACKGROUND

1. Field of Invention

Embodiments of the present invention relate generally to rolling mill coil handling systems, and more particularly to a system for the removal and transport of product coils from downenders.

2. Description of Prior Art

At the conclusion of a hot rolling process, long products such as small diameter bars, rods and the like are typically accumulated into vertical coils. The coils are then often transported away on pallets having stems projecting vertically through the coils. Downenders are then employed to rotate the pallets through 90° to thereby orient the stems horizontally, with the coils now being suspended from the horizontal stems.

One example of a known downender is disclosed in U.S. Pat. No. 8,388,297, the disclosure of which is herein incorporated by reference.

Downended coils are typically transferred from the horizontally disposed pallet stems to a hook carrier system, which serves to transport the coils to other locations for further processing, e.g., compaction tying or banding, etc.

During their removal and transfer to the hook carrier system, the coils can suffer surface damage caused by sliding frictional contact with the handling equipment. Efforts to reduce or eliminate frictional sliding contact have included the use of an intermediate coil car transfer system, one example being that disclosed in U.S. Pat. No. 8,540,070. Such coil car transfer systems typically require expensive auxiliary hydraulic systems and piping accompanied by additional electrical equipment and programming. Coil car transfer systems also occupy substantial space on the mill floor, which is often unavailable in existing mill installations.

SUMMARY

In an exemplary embodiment of the present invention to be described hereafter in greater detail, coils are transferred directly from the horizontally disposed pallet stems to a horizontal hook carrier system, without the use of coil cars or other like intervening transfer equipment, and without surface damage to the coiled product resulting from sliding frictional contact with the handling equipment.

DETAILED DESCRIPTION

Figure 1:
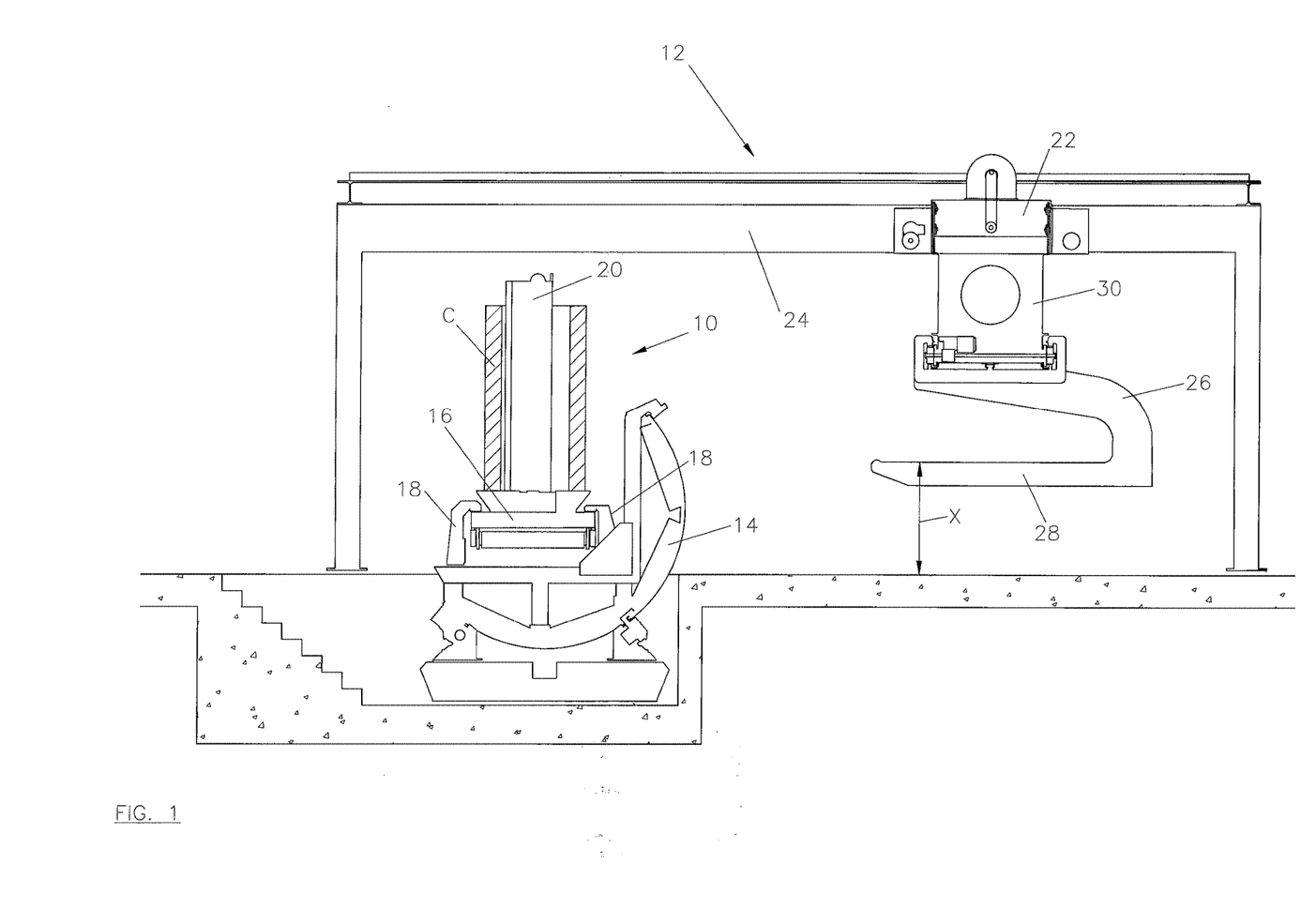
FIGS. 1, 2, 3, 5, and 7 are schematic illustrations depicting successive stages in the operation of an exemplary embodiment of the present invention.

With reference initially to FIG. 1, an exemplary embodiment of a coil handling system in accordance with the present invention includes a coil downender generally depicted at 10, and a horizontal hook carrier system generally depicted at 12.

The downender 10 comprises a rotatable cradle 14 on which a pallet 16 is removably secured by clamps 18 or the like. The pallet has a hollow stem 20 projecting vertically through a coil "C" supported on the pallet. The coil may typically be comprised of a hot rolled bar or rod product formed around the stem and supported on the pallet.

The hook carrier system 12 may comprise a motor driven module 22 moveable towards and away from the downender 10 along an overhead track 24. A C-shaped hook 26 having a horizontally disposed arm 28 is suspended from the module 24 by means including an elevator mechanism 30.

As shown in FIG. 1, the elevator mechanism 30 has been operated to position the arm 28 of the hook 26 at a vertical distance "X" from the mill floor.

Figure 2:
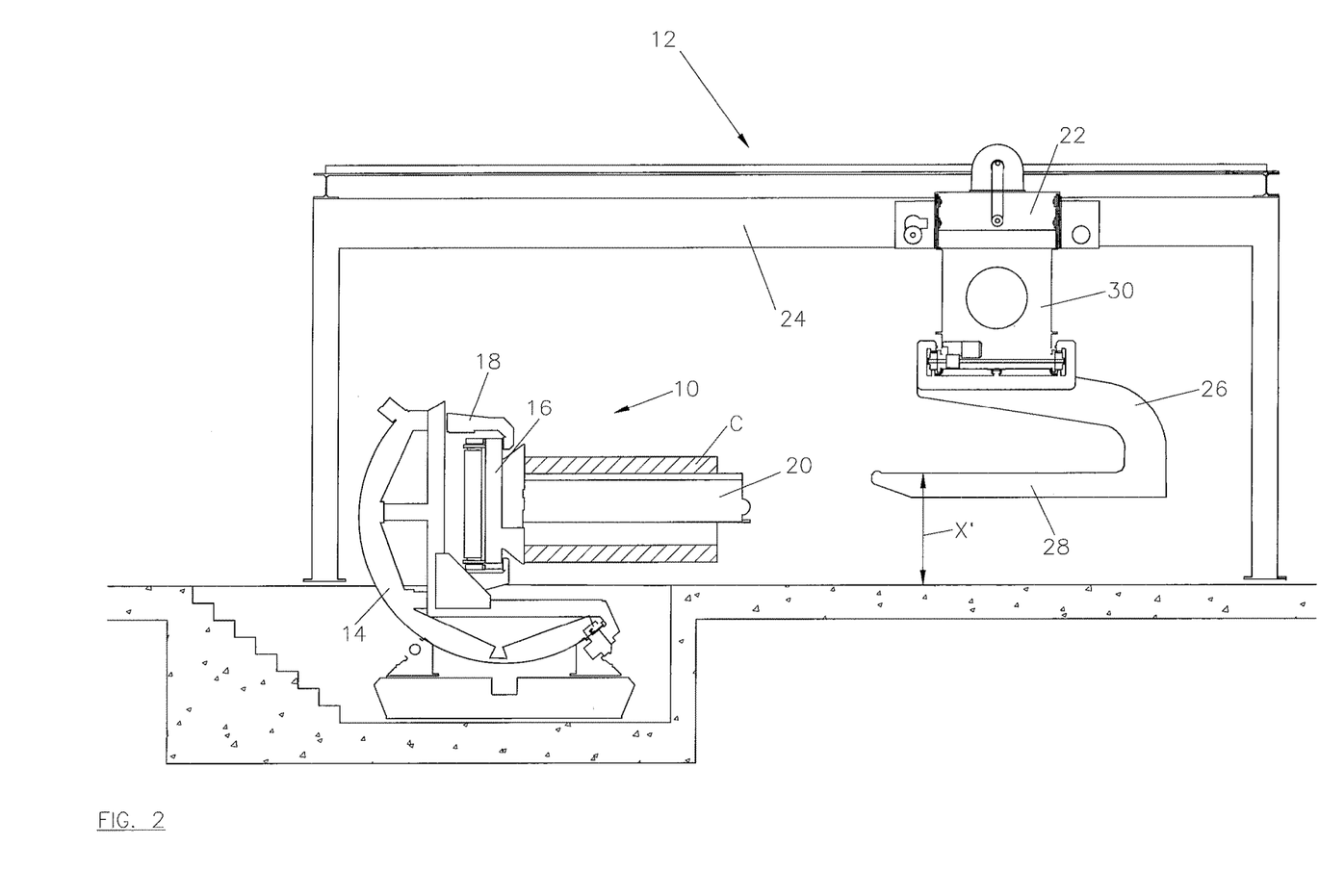

In order to transfer the coil C from the pallet stem 20 to the hook 26, and as shown in FIG. 2, the downender 10 is operated to rotate the cradle 14 through 90° to orient the stem 20 horizontally. In addition, the elevator mechanism 30 is operated to lower the hook 26, positioning the arm 28 at a reduced distance $X^1$ from the mill floor.

Figure 3:
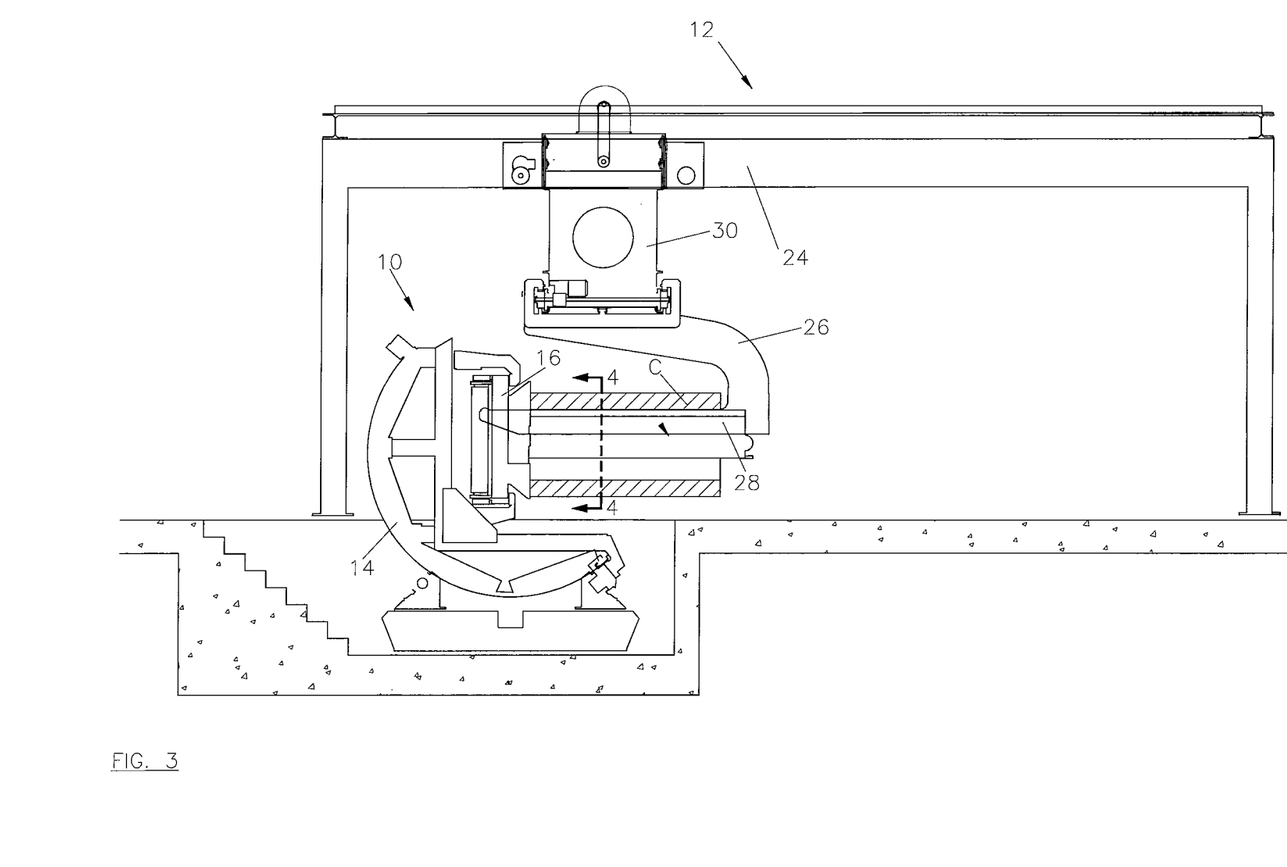
Figure 4:
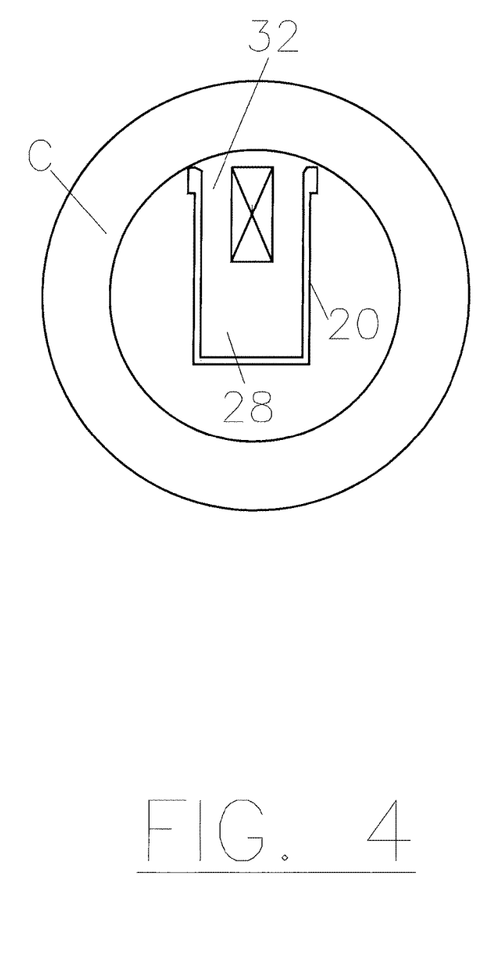
FIGS. 4 and 6 are cross sectional views taken respectively along line 4-4 of FIG. 3 and line 6-6 of FIG. 5.

Then, as depicted in FIG. 3, the motor driven module 22 is advanced to a position at which the arm 28 of the hook 26 is inserted axially into the stem 20. At this stage, and as shown in FIG. 4, the coil C remains supported on and suspended from the stem 20, with the arm 28 underlying and spaced beneath the coil.

Stem 20 may have a generally U-shaped cross sectional configuration, or any other configuration, provided that a slot 32 extends along its length, with the slot being arranged to face upwardly when the stem is horizontally disposed.

Figure 5:
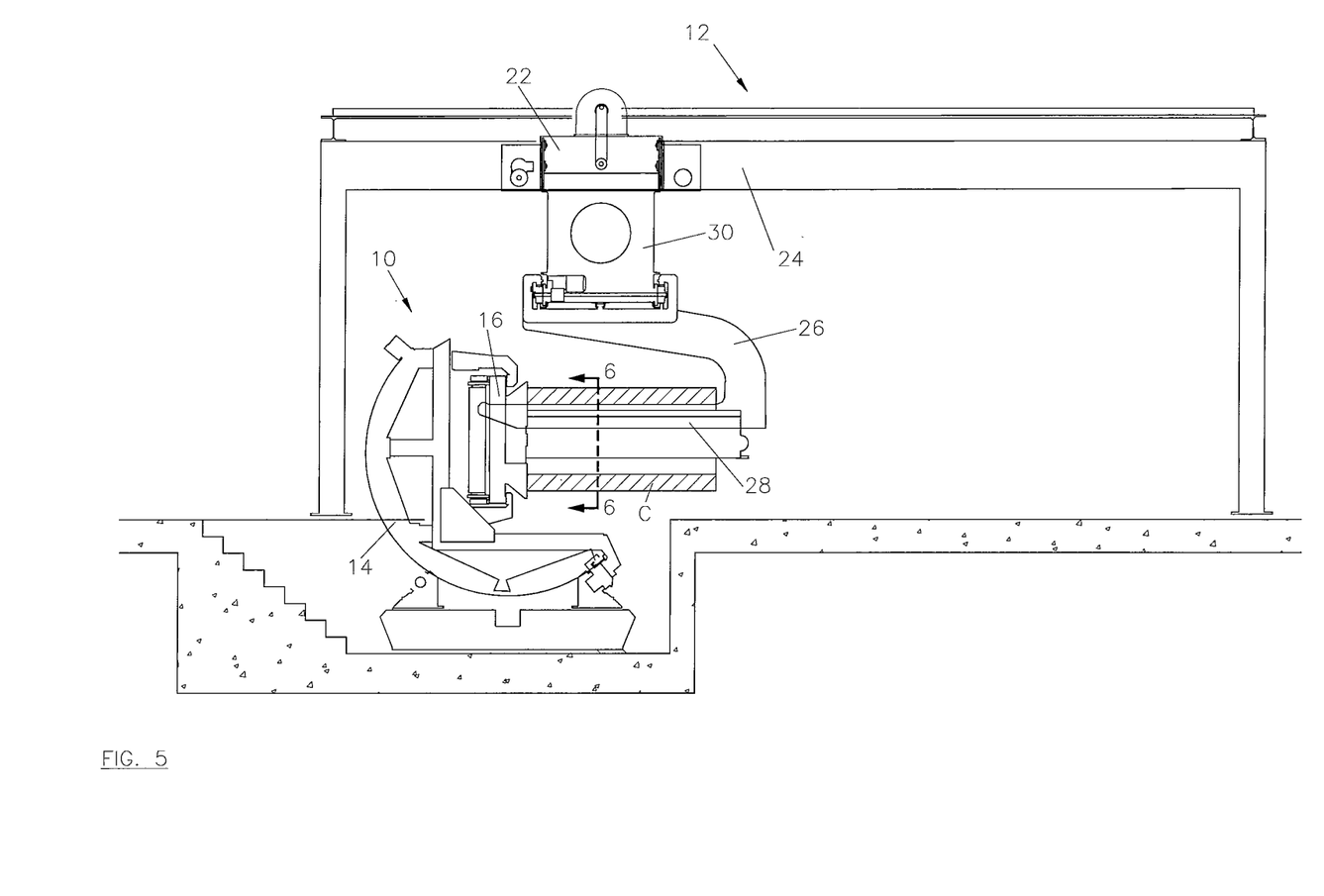
Figure 6:
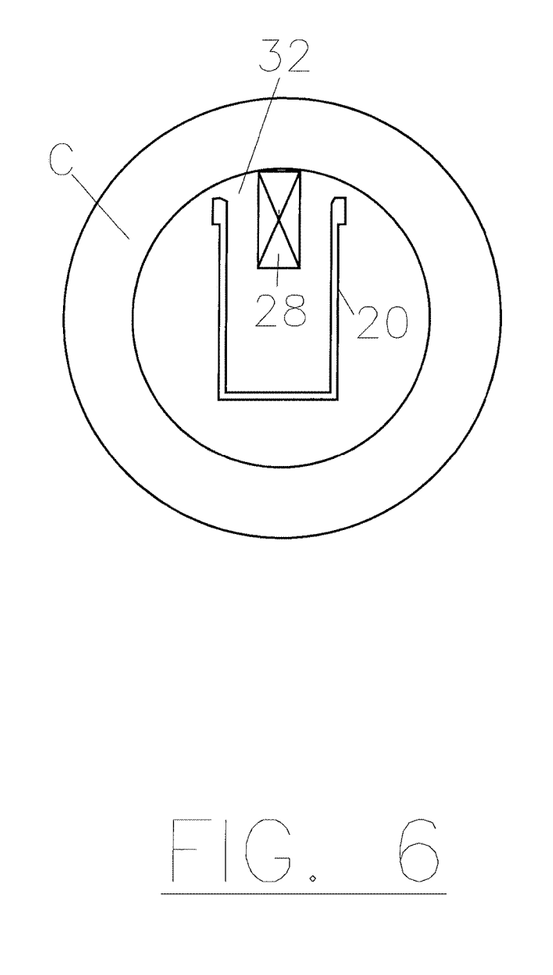

As shown in FIG. 5, the elevator mechanism 30 is then operated to raise the hook 26 and thus return the arm 28 to the elevated level shown in FIG. 1, or to a higher level, depending on the requirements of the installation. As a result, as shown in FIG. 6, the arm 28 projects upwardly through slot 32 to engage and lift the coil C from the stem 20. The coil is now suspended from the arm 28 and is no longer in contact with the stem 20.

Instead of lifting the arm 28 through the slot 32 in the stem 20, transfer might be effected by lowering the stem. In both cases, transfer is achieved by relative vertical movement between the arm and the stem.

Figure 7:
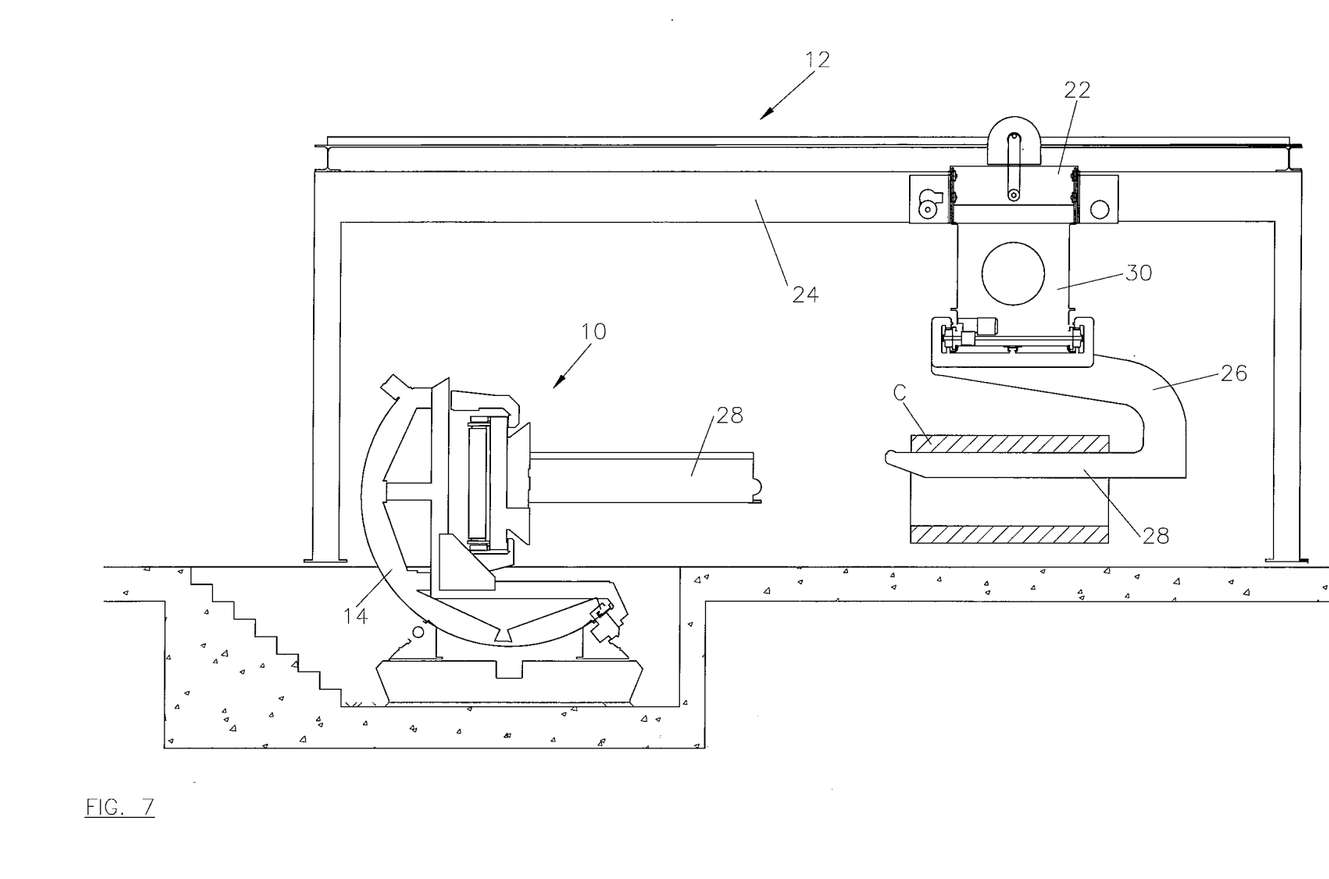

As shown in FIG. 7, the motor driven module 22 is then returned along track 24 to its starting position (as shown in FIG. 1), resulting in the coil C suspended from arm 28 being axially withdrawn from the stem 20, without the coil experiencing any surface damage occasioned by sliding contact with either the stem 20 or the arm 28.

Although not shown, it will be understood by those skilled in the art that the hook carrier system 12 will typically include additional branches designed to convey the hook 26 to other locations where the coil C will be subjected to additional handling procedures, e.g., compaction and tying or banding.

In order to further enhance the utility and adaptability of the hook carrier system 12, the hook 26 may be shiftable laterally to align the arm 28 with other laterally disposed coil handling or processing components. To this end, as shown in FIG. 1, the elevator mechanism 30 may be provided with rollers 34 on its front and back sides arranged along paths extending transversely with respect to the direction of movement of the motor driven module 22 along track 24. The hook 26 may have a channel shaped head 36 carried on the rollers 34. At least some of the rollers 34 may be driven to shift the hook laterally to and fro.

What is claimed is:

1. A rolling mill coil handling system comprising:
    a downender for rotating a coil between a vertical position supported on a pallet, and a horizontal position suspended from a hollow stem projecting from said pallet;
    a hook carrier system having a C-shaped hook with a horizontally projecting arm; and
    an elevator mechanism that operates to raise said C-shaped hook and return said projecting arm to a specified level, said hook carrier system including system components for manipulating said hook to axially insert said arm into said stem, to effect relative vertical movement between said arm and said stem, with said arm being passed through a slot in said stem to thereby contact and position said coil at a level at which said coil is no longer in contact with said stem, and to axially withdraw said coil from said stem so as to minimize surface damage occasioned by sliding contact with either the stem or projecting arm.

2. The coil handling system of claim 1 wherein said system components additionally serve to laterally shift said C-shaped hook.

3. The coil handling system of claim 1 wherein said system components include a motor driven module moveable towards and away from said downender on an overhead track.

4. The coil handling system of claim 3 wherein said system components further include an elevator mechanism carried by said motor driven module.

5. A rolling mill coil handling system, comprising:
    a downender for manipulating a stem pallet between a first position at which the stem of said pallet projects vertically through a cylindrical coil of a hot rolled product, and a second position at which the stem of said pallet is disposed horizontally, said stem being hollow and having a longitudinally extending slot communicating with the interior of said stem, said slot being arranged to face upwardly when said stem pallet is in said second position; and
    a hook carrier system comprising a motor driven module movable towards and away from said downender along an overhead track, and a C-shaped hook having a horizontally disposed arm, said hook being suspended from said motor driven module by an elevator mechanism so as to minimize surface damage occasioned by sliding contact with either the stem or projecting arm, said elevator mechanism operates to raise said C-shaped hook and return said disposed arm to a specified level, said motor driven module and said elevator mechanism being operative in concert:
    (a) to axially insert said arm into said stem at a level beneath said coil;
    (b) to raise said arm through said slot to engage and raise said coil to a level which said coil is out of contact with said stem; and
    (c) to axially withdraw said coil package from said stem.

* * * * *